United States Patent [19]

Bangs

[11] 4,454,518

[45] Jun. 12, 1984

[54] TEMPERATURE CONTROL OF INK FOR INK JET PRINTER

[75] Inventor: Richard G. Bangs, Ithaca, N.Y.

[73] Assignee: NCR Corporation, Dayton, Ohio

[21] Appl. No.: 377,655

[22] Filed: May 12, 1982

[51] Int. Cl.$^3$ ............................................ G01D 15/18

[52] U.S. Cl. ............................................ 346/140 R

[58] Field of Search ............................ 346/140 PD

[56] References Cited

U.S. PATENT DOCUMENTS 4,301,459 11/1981 Isayama et al. .............. 346/140 PD

OTHER PUBLICATIONS

Ruddy, G. A., Viscosity Control Circuit, Mar. 1974, IBM Technical Disclosure Bulletin, vol. 16, No. 10, p. 3295.

*Primary Examiner*—George H. Miller, Jr.
*Attorney, Agent, or Firm*—J. T. Cavender; Wilbert Hawk, Jr.; George J. Muckenthaler

[57] ABSTRACT

The ink fluid in a reservoir is heated to establish a temperature differential between the ink fluid therein and the ink flowing through a print head and being ejected therefrom in the form of ink droplets. The temperature differential in the ink tends to reduce or substantially eliminate any air or other type gas bubbles which may be present in the ink fluid at the lower temperature.

2 Claims, 3 Drawing Figures

TEMPERATURE CONTROL OF INK FOR INK JET PRINTER

BACKGROUND OF THE INVENTION

In the field of non-impact printing, the most common types of printers have been the thermal printer and the ink jet printer. When the performance of a non-impact printer is compared with that of an impact printer, one of the problems in the non-impact machine has been the control of the printing operation. As is well-known, the impact operation depends upon the movement of impact members, such as print hammers or wires or the like, which are typically moved by means of an electro-mechanical system and which may, in certain applications, enable a more precise control of the impact members.

The advent of non-impact printing, as in the case of thermal printing, brought out the fact that the heating cycle must be controlled in a manner to obtain maximum repeated operations. Likewise, the control of ink jet printing, in at least one form thereof, must deal with rapid starting and stopping movement of the ink fluid from a supply of the fluid. In each case of non-impact printing, the precise control of the thermal elements and of the ink droplets is necessary to provide for both correct and high-speed printing.

In the matter of ink jet printing, it is extremely important that the control of the ink droplets be precise and accurate from the time of formation of the droplets to depositing of such droplets on paper or like record media and to make certain that a clean printed character results from the ink droplets. While the method of printing with ink droplets may be performed either in a continuous manner or in a demand pulse manner, the latter type method and operation is disclosed and is preferred in the present invention in applying the features of the present invention. The drive means for the ink droplets is generally in the form of a crystal or piezoelectric type element to provide the high speed operation for ejecting the ink through the nozzle while allowing time between droplets for proper operation. The ink nozzle construction and operation must be of a nature to permit fast and clean ejection of ink droplets from the print head.

Additionally, in an ink jet printer, it is considered a basic requirement to provide some type of means for reducing or substantially eliminating any air or other type gas bubbles that may form in the ink fluid. In a drop-on-demand ink jet printing device, the presence of such gas bubbles has been suspected to be a primary factor affecting performance and, in certain instances, even inhibiting ejection of ink droplets. It has been determined that the presence of air in or passing through the nozzle of the piezoelectric element affects ink droplet ejection and also that nozzle surface conditions, wherein various forms of contamination such as lubricants, detergents, wetting agents, smoke, paper dust or other materials, have an effect on and may even provoke the ingestion of air through the nozzle. Further, it has been observed that air can be ingested into the ink channel either by disturbing the supply conduit leading from the ink reservoir to the ink jet print head, as represented by the piezoelectric element, or air can be ingested into the system by subjecting the print head to axial acceleration.

It is also known that the size of the air bubble or the amount of air within the system affects the ejection of ink droplets in the manner wherein a small air bubble or amount of air may increase or decrease the velocity of the ink droplets being ejected, whereas a large air bubble or amount of air may block the ink channel and thereby inhibit ejection of ink droplets. It is further noted that purging the system normally removes the larger amounts of air that tend to block the ink channel, however, smaller bubbles or amounts of air may remain in the channel and thus affect the velocity of the ink droplets. The reduction or substantial elimination of gaseous bubbles in the ink fluid is a desirable feature in the operation of an ink jet printing system.

Representative documentation in the field of ink jet printing and in preventing gaseous bubbles by heating the ink fluid used during the printing operation includes U.S. Pat. No.3,179,042, issued to M. Naiman on Apr. 20, 1965, which discloses an ink steam generating device consisting of a pair of electrodes which are immersed in the ink to produce a high $I^2R$ loss. Current passes through the ink in a gap between the electrodes causing generation of heat which will vaporize that portion of the ink contained between the electrode tips, and which vapor will tend to expand and exert a sufficient pressure on the ink directly above the tips to force individual droplets of ink from the tube to the paper. The ends of the electrodes are placed within a tube in which ink is supplied through a duct from an ink supply. Ink is maintained near its boiling point by means of a heater placed within the ink supply, and the ink within the area of the electrode gap is caused to become vaporized or ionized and to cause any trapped gases to expand. The expansion of gases causes a great force on the ink above the electrodes and ink is propelled out the open aperture of the tube in the form of droplets.

U.S. Pat. No. 4,007,684, issued to R. Takano et al. on Feb. 15, 1977, discloses an ink liquid warmer provided in the ink supply system to maintain the ink at a predetermined temperature at the nozzle without regard to temperature condition of the ink supply or to ambient conditions. The predetermined ink liquid temperature maintains the viscosity and surface tension of the ink liquid at a constant value. The system includes thermistors which are stable temperature devices and which maintain the predetermined temperature.

SUMMARY OF THE INVENTION

The present invention relates to ink jet printing and more particularly to means for reducing or substantially eliminating any air or other type gas bubbles that may be present or that may form in the ink fluid. The means for so reducing or eliminating such bubbles is intended to prevent the formation thereof in the ink channel and at the area or surface of the nozzle, and also to dissolve any such bubbles which may be present in these locations by reason of air being ingested through the nozzle.

In a preferred embodiment of the invention, the supply of ink in the reservoir is heated so as to maintain a temperature differential between the temperature of the reservoir contents and the ambient temperature. A constant wattage heater, sized and formed to at least partially envelop or surround the ink reservoir, is provided for increasing the temperature of the ink fluid in the reservoir by an amount and in the range of 10 degrees to 15 degrees C. above the ambient temperature. As the ink fluid cools, the gas solubility capability increases and effectively reduces or minimizes presence of gas bubbles in the fluid.

An alternate method of reducing or substantially eliminating air bubbles in the ink fluid is to decrease the temperature of the piezoelectric element and therefore the ink in the nozzle channel relative to the temperature of the ink in the reservoir. In such latter method, a thermoelectric cooling device is provided to envelop or surround the piezoelectric element of the print head and reduce the temperature thereof in a range of about 10 degrees to 15 degrees C. below the ambient temperature.

In view of the above discussion, the principal object of the present invention is to provide means for reducing or substantially eliminating gaseous bubbles in the ink fluid of an ink jet printing system.

Another object of the present invention is to provide means for causing a temperature differential between the temperature of the ink fluid in an ink supply reservoir and ambient temperature for the purpose of reducing the presence or the formation of bubbles in the fluid.

An additional object of the present invention is to provide means for heating the ink fluid in a reservoir to reduce or eliminate bubbles in the fluid used in the printing operation.

A further object of the present invention is to provide means for establishing a temperature differential between the ink fluid in the reservoir and the ink in the print head for minimizing presence or formation of bubbles in the flow of ink.

Additional advantages and features of the present invention will become apparent and fully understood from a reading of the following description taken together with the annexed drawing.

DESCRIPTION OF THE PREFERRED EMBODIMENT

Figure 1:
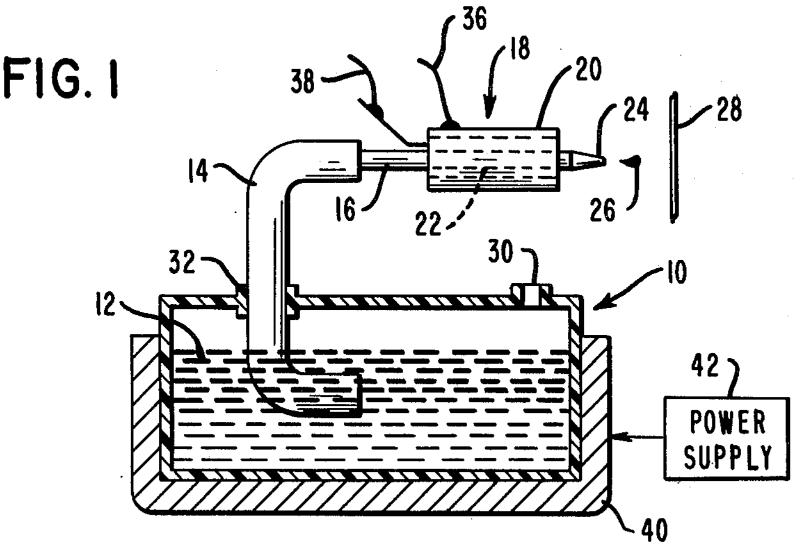
FIG. 1 shows a diagrammatic view, partly in section, of a printing system incorporating the subject matter of the present invention.

As seen in FIG. 1 of the drawing, an ink reservoir 10 contains a supply of printing ink 12 which is sufficient for printing upwards of, for example, several million characters. A length of tubing 14, made of Tygon (a polyvinyl chloride material manufactured by The Norton Chemical Company) or the like, is immersed at one end thereof into the ink fluid 12 in the reservoir 10 and is connected at the other end thereof to a glass or like conduit 16, in turn, being a part of an ink jet print head 18 of the transducer type. The print head 18 includes a body portion 20 of cylindrical form having a glass tube or glass lined passageway 22 therethrough (see also FIG. 3) for receiving the conduit 16 which terminates in a nozzle 24 for ejecting a droplet 26 of printing ink to be applied to record media 28, which media may be in the form of paper carried on a drum or platen (not shown). A filter-type vent 30 is provided in the top of the reservoir 10 for access to the atmosphere and a grommet 32 is provided to support the tube 14 in proper position and to seal the tube with the reservoir top.

Figure 3:
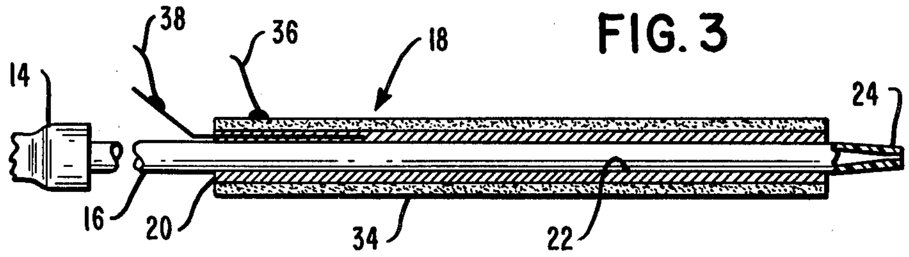
FIG. 3 shows an enlarged view, partly in section, of a print head commonly used in printing operations.

As better seen in the enlarged view of FIG. 3, the print head 18 may be of a type, as disclosed in Arndt U.S. Pat. No. 3,832,579, appropriate for and commonly used in printing operations and which includes a piezoelectric device or tubular type transducer 34 for causing ejection of the ink droplets 26 (FIG. 1) either in synchronous or asynchronous manner from the nozzle 24. The ink droplets 26 so produced are of essentially the same size and are normally ejected at a constant velocity. Leads 36 and 38 are appropriately connected to the print head 18 for actuating the transducer 34 to cause ejection of the ink droplets.

A constant wattage heater 40, sized and formed to at least partially envelop or surround the reservoir 10 (FIG. 1), provides and establishes a temperature differential between the temperature of the ink fluid 12 in the reservoir 10 and the temperture of the ink fluid in the print head 18. Thermostatic control of the resistance-type heater 40 is not required, since advantage is taken of one consequence of Newton's law of cooling wherein the rise in the temperature of a body above ambient temperature is approximately proportional to the flow of heat to the surrounding area. Another way of stating such law is that the rate at which a body cools by radiation is proportional to the temperature difference between the body and the ambient temperature, in the case where the body is warmer than ambient.

This law is shown by the following equation:

$$(dT/dT) = -K(T - T_A)$$

where $(dT/dt)$ = rate of cooling and
K = proportionally constant
T = Temperature of body
$T_A$ = Ambient Temperature It has been found that if the ink liquid 12 in the reservoir 10 is continuously heated by means of the heater 40 from a power supply 42, the dissolved gas capacity of the liquid is reduced, that is, gas bubbles are formed and released in the reservoir prior to entry of the liquid into the conduit 16 within the ink channel or passageway 22 of the print head 18. Also, the liquid being subjected to ambient temperatures that are cooler than the liquid 12 in the reservoir 10 is reduced in temperature and thereby displays increased dissolved gas volume capability.

It is thus seen that ink 12 in the nozzle 24 can generate air bubbles around the nucleation point and air bubbles also can be dissolved out of solution. In this regard, as the ink 12 in the reservoir 10 is heated, the dissolved gases are forced out of solution, thus forming bubbles which are released into the atmosphere. The volume of the dissolved gas is less in warm liquids than in cool liquids, and the warm liquid in effect is undersaturated. Therefore, it is seen that as the warm ink cools in the passageway 22 of the print head 18 and any air bubbles present are reduced or dissolved and the possibility of generating air bubbles is minimized. Hence, the heating of the fluid 12 in the reservoir 10 results in a fluid having a lower gas solubility and further that when the fluid enters the print head 18 and is cooled, the gas solubility of the fluid increases and the tendency is to dissolve any air bubbles which may be in the print head 18 or any air bubbles which may be generated therein.

The material for making the reservoir 10, which it should be noted is of a size to contain a few ounces of the ink 12, is a high temperature plastic capable of withstanding temperatures up to and perhaps above 40 degrees C. The heater 40 may be a suitable conduction-type with 110 volts applied as the power supply 42.

Figure 2:
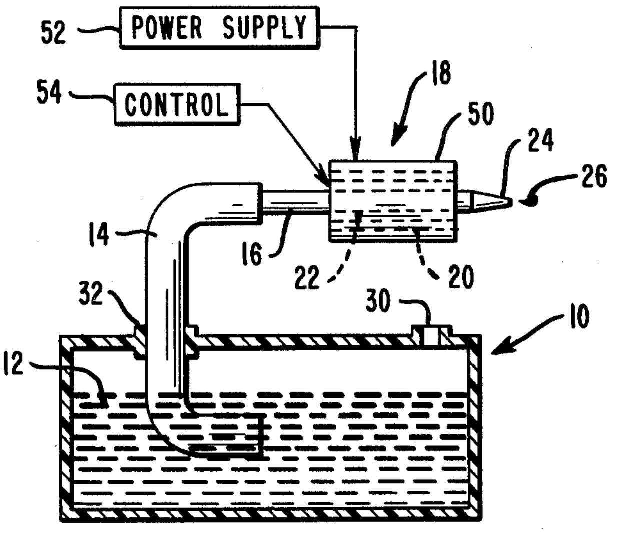
FIG. 2 shows a similar view of the printing system incorporating an alternate arrangement of the subject matter of the present invention.

FIG. 2 shows an alternate means for reducing or substantially eliminating gas bubbles in the printing system and wherein like reference numerals are used for the various common elements, as described for FIG. 1. The reservoir 10 contains the ink 12 which travels through tubing 14 and conduit 16 and then to the print head 18. The print head 18 has a body portion 20 with passageway 22 and a nozzle 24 along with a transducer 34 for initiating and generating the ink droplets 26. The leads 36 and 38 also are appropriately connected for actuating the transducer 34, as shown in FIG. 3.

In this arrangement (FIG. 2), the temperature differential is accomplished or established by use of a thermoelectric cooling element 50 surrounding the print head 18 to cool the ink 12 from an ambient temperature in the reservoir 10 and to thereby increase the air or other type gas solubility capability of the ink 12. The cooling device 50 may be an appropriate heating and cooling or absorption type apparatus connected with a suitable power supply 52 for causing a decreasing or lowering of the temperature of the passageway 22 in an amount of 10 degrees to 15 degrees C. below the temperature of the ink 12 in the reservoir 10, and thereby cooling the ink as it travels through the print head 18 to the nozzle 24. In the print head cooling arrangement a thermostat or like control device 54 may be used to control the cooling element 50.

It is thus seen that herein shown and described is an ink jet system which utilizes apparatus for reducing or substantially eliminating gaseous bubbles in the flow of ink fluid during printing operations. The cooler ink fluid is capable of increased solubility of gases and presents a gas soluble atmosphere to reduce the problem of bubbles in the stream of ink. The apparatus of the present invention enables the accomplishment of the objects and advantages mentioned above, and while a preferred embodiment and a modification have been disclosed herein, other variations thereof may occur to those skilled in the art. It is contemplated that all such variations not departing from the spirit and scope of the invention hereof are to be construed in accordance with the following claims.

I claim:

1. Means for reducing formation of gaseous bubbles in the ink of an ink jet printer comprising a
reservoir containing a supply of ink, a
piezoelectric transducer operably associated with and carried by said reservoir for ejecting ink in droplet form onto record media, and a
constant wattage conduction-type heater operably associated with and formed for substantially surrounding the reservoir for continuously heating thereof and establishing a temperature differential of 10 to 15 degrees C. between the temperature of the ink within the heated reservoir and the ink in said piezoelectric transducer at ambient temperature whereby the lower temperature ink in the transducer by reason of increased gas solubility dissolves bubbles present or which may be generated therein.

2. In an ink jet printer, a
reservoir containing a supply of ink, a
piezoelectric transducer operably associated with and supported from the reservoir for ejecting droplets of ink onto record media, and a
constant wattage conduction-type heater operably associated with and formed for substantially enveloping the reservoir for continuously heating thereof and creating a temperature differential of 10 to 15 degrees C. between the temperature of the ink in the heated reservoir and the ink in the transducer at ambient temperature whereby the lower temperature ink in the transducer has the increased capability of dissolving gaseous bubbles present therein and inhibits generation of such bubbles in the transducer.

* * * * *